July 8, 1969  D. W. ROY ET AL  3,454,685
METHOD OF FORMING ZINC SELENIDE INFRARED
TRANSMITTING OPTICAL ELEMENTS
Original Filed Aug. 21, 1961  Sheet 1 of 3
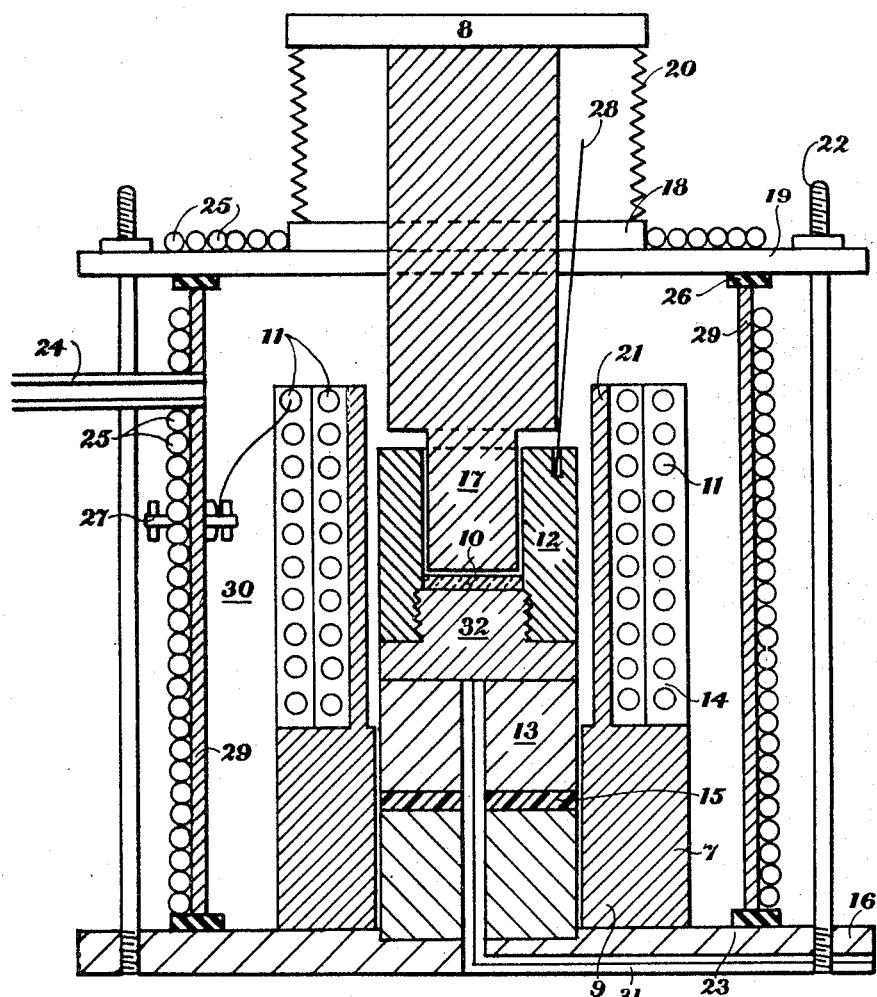
Donald W. Roy
William F. Parsons
INVENTORS
Walter O. Hockadon
Paul R. Holmes
Henry M. Chapin
ATTORNEYS

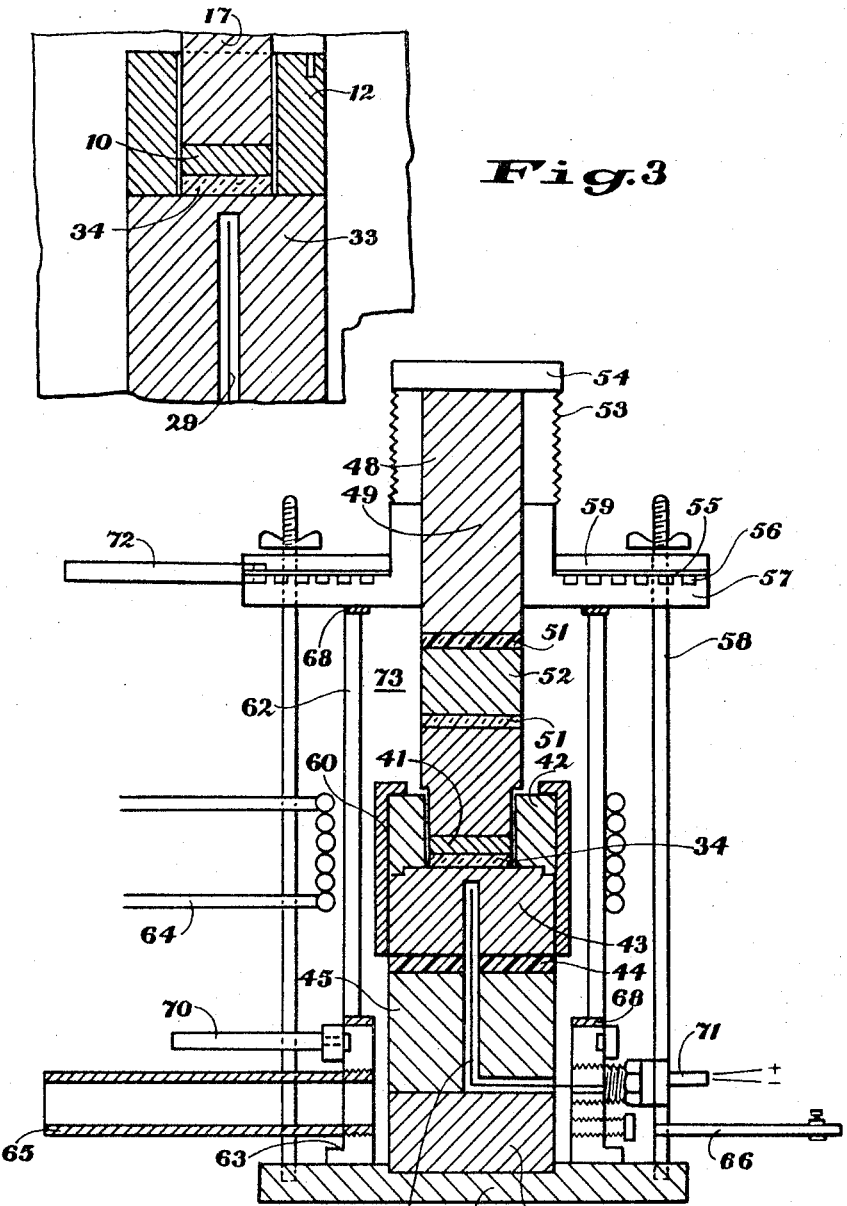

July 8, 1969            D. W. ROY ET AL            3,454,685
METHOD OF FORMING ZINC SELENIDE INFRARED
TRANSMITTING OPTICAL ELEMENTS
Original Filed Aug. 21, 1961            Sheet 3 of 3
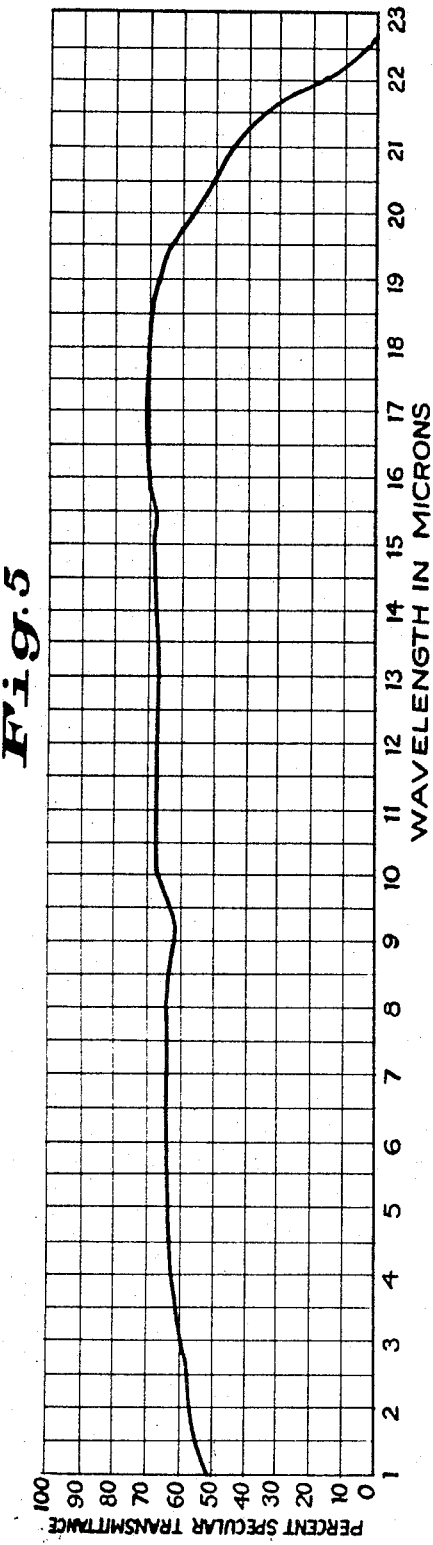
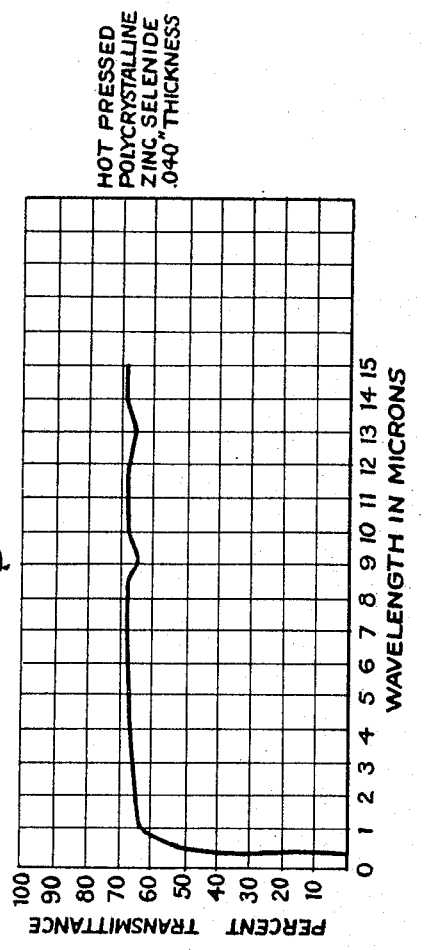
Donald W. Roy
William F. Parsons
INVENTORS
BY Walter O. Hodgdon
Paul R. Holmes
Henry M. Chapin
ATTORNEYS

United States Patent Office 3,454,685
Patented July 8, 1969

3,454,685
METHOD OF FORMING ZINC SELENIDE INFRARED TRANSMITTING OPTICAL ELEMENTS
Donald W. Roy and William F. Parsons, Rochester, N.Y., assignors to Eastman Kodak Company, Rochester, N.Y., a corporation of New Jersey
Original application Aug. 21, 1961, Ser. No. 132,990. Divided and this application July 19, 1965, Ser. No. 489,090
Int. Cl. B29d 11/00; C01b 19/00
U.S. Cl. 264—1                    5 Claims

ABSTRACT OF THE DISCLOSURE

Method of making zinc selenide optical elements by hot pressing zinc selenide powder at a pressure greater than 10,000 p.s.i. and at a temperature within the range 1550° F. to 2000° F. while in an inert atmosphere.

---

This is a division of application Ser. No. 132,990 filed Aug. 21, 1961 now abandoned.

This invention relates to optical elements and to methods for making optical elements. More particularly, this invention relates to methods for hot pressing transparent polycrystalline optical elements of various geometrical shapes under high pressures, temperatures and vacuum from zinc selenide powder. These elements may be employed as windows in missiles and projectiles and related devices requiring such infrared optics. These zinc selenide windows are also useful as substrates for optical filters. Zinc selenide windows produced by our process are very stable to thermal shock and have desirable transmittance characteristics.

An object, therefore, of the present invention is to provide an article of manufacture consisting essentially of transparent polycrystalline zinc selenide.

Another object is to provide a homogeneous solid of molded zinc selenide having a density of from 99% up to and including the theoretical density.

Still another object is to provide a molded optical element which transmits in the visible and infrared regions of the electromagnetic spectrum.

Another object is to provide an infrared transmitting element which will be suitable for use in missiles, projectiles, satellites and related devices.

Yet another object is to provide a method of molding zinc selenide to form such optical elements.

A further object is to provide novel molding apparatus suitable for hot pressing zinc selenide powder into a solid body.

In accordance with a feature of this invention, zinc selenide powder is hot pressed in a compression mold under conditions of high pressure, high temperature and vacuum or inert atmosphere into a solid molded unit of transparent zinc selenide. The mold may be of any suitable shape to form a window or a lens of desired contour.

In accordance with another feature of this invention, novel apparatus particularly adapted to hot press zinc selenide powder into a solid polycrystalline unit under a vacuum or an inert atmosphere is provided.

The invention will be further understood by reference to the following detailed description and drawings in which:

FIG. 1 is a view of a transparent polycrystalline solid molded from zinc selenide powder;

FIG. 2 is an elevational view partly in section of a compression molding device for molding zinc selenide powder in accordance with this invention;

FIG. 3 is an elevational view, partly in section, of another form of compression molding apparatus suitable for the hot pressing of zinc selenide in accordance with the present invention;

FIG. 4 is an elevational view, partly in section, of a compression molding device for molding zinc selenide powder into optical units which employs high frequency heating;

FIG. 5 is a graph showing the specular transmittance in the infrared region of transparent polycrystalline zinc selenide prepared in accordance with the present invention;

FIG. 6 is a graph showing the specular transmittance in the visible and infrared region of improved short wavelength polycrystalline zinc selenide prepared in accordance with the present invention.

The molding apparatus shown in FIG. 2 comprises a base 16, a silicone gasket 23, a block 9, a thermal insulator 15, a block 13, a molding cylinder 12 having a threaded plug 32, a molding plunger 17, having a head 8 which is adapted to be attached to a prime mover, not shown, such as the piston of a hydraulic press to move the plunger 17 vertically into and out of molding cylinder 12 and thereby press the zinc selenide powder into the solid unit shown at 10.

The head 8 is attached to aligning ring 18 by metal bellows 20 thereby assuring a vacuum seal around the upper portion of the plunger 17.

A cylinder 21 encloses the molding cylinder 12 and lower portion of the plunger 17, and is supported on block 7. A heating unit 14 comprising a refractory casing is positioned around cylinder 21 and is also supported on block 7 and contains electric heating coils 11, the terminals for which are shown at 27.

A cylinder 29 is positioned concentrically in respect to cylinder 21 and forms a vacuum chamber 30, the ends of which are closed by gaskets 23 and 26 and plates 16 and 19. Cooling coils 25 are positioned in contact with the outer surface of cylinder 29. A conduit 24 connects the vacuum chamber 30 to a suitable vacuum system not shown. The assembly is further secured by the coaction of top plate 19 and threaded rods 22 and base plate 16.

The temperature is measured by either one or by both thermocouples 28 and 31 which are suitably located in channels respectively positioned adajacent the molding position.

The block 13 and cylinder 12 with its threaded plug 32 are preferably made of molybdenum or molybdenum alloy. Block 9 may be made of Nichrome or stainless steel.

A satisfactory hot pressed, transparent polycrystalline zinc selenide window may be made employing the apparatus shown in FIG. 1 as follows:

Zinc selenide powder is introduced into the cavity of cylinder 12 beneath plunger 17. Chamber 30 is evacuated through pipe 24. Next cooling water is circulated through the cooling coils 25 and also through the platens, not shown, of the hydraulic press, and then electric current is supplied to the heater coils 11 through terminals 27. The temperature of the mold is monitored by means of platinum-rhodium thermocouples 28 and 31. The hot-pressing apparatus is heated until the temperature, as indicated by thermocouple 31, reaches 2050° F., and is maintained at this temperature, under vacuum for a 15-minute bake-out period. At the end of the bake-out, the temperature is reduced to 1800° F. When the temperature, as indicated by thermocouple 31, reaches 1800° F., force is applied to the head 8 of plunger 17 by the hydraulic press, not shown, and the pressure is raised on the zinc selenide powder to approximately 30,000 p.s.i. This pressure in maintained on the zinc selenide for from 15 to 30 minutes while the indicated temperature is held at 1800° F. Due to the nature of the thermocouple technique, the indicated temperature for optimum results may vary from apparatus to apparatus by as much as approximately ∓10%. At the end of the pressing period, the power is shut off and argon, or other inert gas, is bled into chamber 30 from a source, not shown. The assembly is allowed to cool to about 400° F. as recorded by the thermocouples.

The exact temperature and bake-out period described in connection with the above process is dependent on the particular sample of raw material being used and also on the extent of any prepurification.

The plunger 17 is now withdrawn from the cylinder 12 and the piece of polycrystalline transparent zinc selenide 10 is permitted to cool to approximately room temperature and is removed from the apparatus and employed as desired.

An alternate mold configuration is shown in FIG. 3. In this case, a mold insert 34, rather than the threaded plug 32 of FIG. 2, is employed to retain the powdered zinc selenide charge 10. This modified apparatus can be operated to produce a zinc selenide transparent polycrystalline article as is described in connection with the operation of the apparatus of FIG. 2.

Referring to FIG. 4, an elevational view, partly in section, of another modification of the molding apparatus is shown. This modification employs high frequency heating. In general, however, the parts of the apparatus are similar in kind and operation to that shown in FIG. 2.

The pressed zinc selenide powder is shown at 41. The apparatus comprises molding cylinder 42, mold insert 34, molding block 43, insulator 44 and supporting blocks 45 and 46. Block 46 rests on base 47. Also positioned and sealed to base 47 is a cylindrical chamber 63 through which vacuum conduit 65, a vacuum release conduit 66 and a thermocouple conduit 71 extend. A water pipe 70 connects the chamber 63 to a water supply, not shown. The thermocouple is shown at 67. A quartz cylinder 62 is positioned between members 63 and 57, and separated therefrom by gaskets 68. Cylinders 62 and 63 thus form a vacuum chamber 73, the upper portion of which is closed by plate 57 having water cooling channels 56 is held in position by clamping plate 59. The assembly is clamped by a plurality of clamping rods 58 and cooperating wing nuts.

The molding plunger 48 extends through an aligning aperture in plate 57. Freedom of motion of the plunger and a vacuum seal are achieved by means of the metal bellows 53, the ends of which are sealed respectively to the head 54 of the plunger 48 and to plate 57.

The molding plunger 48 comprises three sections: section 49 is preferably made of stainless steel, section 50 of Nichrome and section 52 of molybdenum. Insulators 51 are positioned between sections 49 and 50 and between sections 50 and 52. The insulators 51 and 44 are of transite or of material of similar or superior thermal insulating properties which will withstand the high temperatures and pressures involved. Cylinder 42, block 43 and mold insert 34, are preferably of molybdenum or molybdenum alloys. Block 45 is of Nichrome and block 46 of Nichrome or stainless steel. The top plates 57 and 59, the base plate 47 and the cylindrical chamber 63 may be of aluminum.

Since molybdenum does not couple efficiently with the high-frequency field, a graphite sleeve 60, which fits snugly over the molding cylinder is employed. The frequency field heats the graphite which in turn heats the mold parts by thermal conduction. If a situation arises in which it is desirable to eliminate the graphite susceptor 60, it is preferable to make the plunger section 52, cylinder 42 and blocks 43 of a material which couples efficiency with the high frequency field. Materials such as the high temperature nickel base alloys may be used.

The apparatus of FIG. 4 is operated at substantially the same schedule of temperature, pressure and vacuum as described above, but due to the high frequency heating, the heating cycle can be considerably reduced.

The above described hot pressing operations give optimum results. However, satisfactory transparent, polycrystalline zinc selenide windows have been produced at temperatures varying from 1550° F. to 2000° F.

Pressures have been varied from about 10,000 p.s.i. to 50,000 p.s.i. Pressures less than 10,000 p.s.i. may result in a window that is not completely pressed to a homogeneous mass. Any pressure in excess of the optimum 30,000 p.s.i. does not seem to contribute to the quality of the window.

The time at pressing temperature has been varied within the limits of about five to sixty minutes. At times less than fifteen minutes, the window may not be pressed out.

Limits are imposed on hot pressing by the available mold materials. The plunger 17, cylinder 12 and block 13 of FIG. 2 must all be strong at high temperatures. An alloy made of molybdenum and titanium and also one made of molybdenum, titanium and zirconium may be employed for these parts when pressing zinc selenide.

A problem in hot-pressing zinc selenide has been the purification of the compound from foreign materials and the establishment of stoichiometry in the compound. The powder can be prepared for hot-pressing during the hot-pressing cycle by heating it in the hot-pressing chamber under vacuum at approximately 2050° F. for 15 to 30 minutes. Partial purification can be achieved before the powder is placed in the hot-pressing apparatus by heating the powder in a slow flow of hydrogen gas at 1742° F. for 6 hours. When partial purification is done by hydrogen treatment, the subsequent vacuum bake out temperature can be reduced to approximately 1975° F. The above purification conditions apply to a particular source of raw materials. It has been found that other sources of raw materials require some variations in purification conditions.

A major problem in the hot-pressing work is the unwanted bonding between the zinc selenide and mold parts. Some cracking of zinc selenide windows has occurred because of bonding to the molybdenum mold parts. It has been found effective to cover the parts of the mold contacting the zinc selenide with a light coat of graphite. This prevents sticking and cracking. It may also be helpful to line the mold cavity with a thin foil of a material such as tungsten.

Zinc selenide windows may be sealed into metal rings to provide infrared transmitting windows hermetically sealed to the metal. The metal may be used as a mounting surface.

Since zinc selenide has a high index of refraction (about 2.89 at red end of the visible) it is a highly refracting material and may be made into lenses of great light-gathering power. Thus, one can coat lead sulfide or other infrared sensitive material on a zinc selenide lens to produce a superior infrared detector. The zinc selenide would increase the radiation density of the photodetector.

PROPERTIES OF HOT-PRESSED ZINC SELENIDE

The hot-pressed zinc selenide takes a good optical polish. It is yellow in color. The hot-pressed polycrystal transmits well through the range from 0.5 micron to about 21 microns, as is shown in FIG. 5 and FIG. 6. Because of its high index, there is appreciable loss of light by reflection, but this may be effectively reduced by applying an anti-reflective coating. The coating material will be an excellent infrared transmitter. Zinc selenide is substantially insoluble in water so that it is anticipated that it will perform satisfactorily in humidity tests.

The theoretical density of the hot pressed polycrystalline zinc selenide is measured as follows:

The density of zinc selenide was measured by the hydrostatic weighing method as described on page 104 in Chapter III on density in A. Weissberger's Physical Methods of Organic Chemistry, vol. 1, Interscience Publishers, Inc., New York (1945). This method is widely recognized as suitable for high precision density measurements of solids and is also described in Section 4.1.3.3 of vol. 6, Part A of Methods of Experimental Physics, Academic Press, New York (1959).

Deviations from theoretical density are indicative of second phase inclusions in the pressing such as impurities or porosity.

We claim:

1. A method of forming a homogeneous transparent solid of zinc selenide having a density in the range of from 99% up to and including theoretical density which comprises introducing zinc selenide powder into a chamber;
preliminarily heating said zinc selenide powder in situ in said chamber in a vacuum at a temperature of about 2050° F. to purify said powder;
reducing the temperature to a lower pressing temperature in the range of about 1550° F. to 2000° F.;
and hot pressing said zinc selenide powder in an inert atmosphere under a pressure of at least 10,000 pounds per square inch and at a temperature within said range.

2. A method in accordance with claim 1 wherein said inert atmosphere is a vacuum.

3. A method in accordance with claim 2 wherein said pressure is within the range of about 10,000 to 50,000 pounds per square inch.

4. A method in accordance with claim 2 wherein said pressing temperature is about 1800° F. and said pressing pressure is approximately 30,000 pounds per square inch.

5. A method in accordance with claim 2 wherein preliminary heating of said zinc selenide powder is for a period of at least 15 minutes before reducing the temperature and hot pressing said powder.

References Cited

UNITED STATES PATENTS 2,362,430 11/1944 Buerger _____ 264—1
3,131,238 4/1964 Carnall et al. _____ 264—332

OTHER REFERENCES

Chemical Abstracts 52:11370 (Fischer).
Fischer, Zeitschrift fur Naturforschung, 13a (1958), pp. 105–110.
"The Growth of Single Crystals," Nitsche. From the Physics & Chemistry of Solids, vol. 17, December 1960.
Fabrication of Infra-Red Transmitting Materials by Hot Pressing Techniques, by Kreidl et al. June 2, 1959.

JULIUS FROME, *Primary Examiner.*

A. H. KOECKERT, *Assistant Examiner.*

U.S. Cl. X.R.

23—55; 264—102, 101